US010945034B2

(12) United States Patent
Baughman et al.

(10) Patent No.: US 10,945,034 B2
(45) Date of Patent: Mar. 9, 2021

(54) VIDEO FRACTAL CROSS CORRELATED ACTION BUBBLE TRANSITION

(71) Applicant: International Business Machines Corporation, Armonk, NY (US)

(72) Inventors: Aaron K. Baughman, Cary, NC (US); Stephen C. Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/509,064

(22) Filed: Jul. 11, 2019

(65) Prior Publication Data

US 2021/0014563 A1 Jan. 14, 2021

(51) Int. Cl.
*H04N 21/442* (2011.01)
*H04N 21/431* (2011.01)
*H04N 5/45* (2011.01)
*H04N 21/4223* (2011.01)
*H04N 21/485* (2011.01)
*H04N 7/01* (2006.01)
*G06K 9/00* (2006.01)

(52) U.S. Cl.
CPC ..... *H04N 21/44218* (2013.01); *G06K 9/0061* (2013.01); *H04N 5/45* (2013.01); *H04N 7/013* (2013.01); *H04N 21/4223* (2013.01); *H04N 21/431* (2013.01); *H04N 21/4312* (2013.01); *H04N 21/4314* (2013.01); *H04N 21/4858* (2013.01)

(58) Field of Classification Search
CPC ....... H04N 21/44213; H04N 21/44218; H04N 21/4314; H04N 21/4316; H04N 21/4858; H04N 21/431; H04N 21/4312
See application file for complete search history.

(56) References Cited

U.S. PATENT DOCUMENTS

| 8,220,022 B1 * | 7/2012 | Pan ................... H04N 21/4312 725/46 |
| 9,298,986 B2 | 3/2016 | Ferlatte |
| 9,618,748 B2 | 4/2017 | Munger |
| 2004/0006566 A1 | 1/2004 | Taylor et al. |

(Continued)

OTHER PUBLICATIONS

Fong, "Eye-Opener: Why Do Pupils Dilate in Response to Emotional States?," Scientific American, Dec. 2012, 9 pages.

(Continued)

*Primary Examiner* — Robert J Hance
(74) *Attorney, Agent, or Firm* — VanLeeuwen & VanLeeuwen; Christopher M. Pignato

(57) ABSTRACT

An approach is provided in which the approach displays a main video feed and multiple secondary video feeds on a display. The multiple secondary video feeds are embedded in the main video feed at multiple locations based on visual characteristics sets of the multiple secondary video feeds. The approach dynamically detects a level of interest of a user at a first one of the locations in the main video feed based on a set of physical characteristics of the user. The approach identifies a first one of secondary video feeds that corresponds to the first location and, in turn, resizes the first secondary video feed based on the detected level of interest.

20 Claims, 9 Drawing Sheets

(56) References Cited

U.S. PATENT DOCUMENTS

| | | | |
|---|---|---|---|
| 2004/0070593 A1* | 4/2004 | Neely | H04N 1/00461 |
| | | | 715/716 |
| 2005/0100319 A1* | 5/2005 | Saed | H04N 5/2624 |
| | | | 386/318 |
| 2005/0175540 A1 | 8/2005 | Oravesky et al. | |
| 2006/0019326 A1 | 1/2006 | Vacanti et al. | |
| 2010/0118200 A1* | 5/2010 | Gelman | H04N 21/41415 |
| | | | 348/578 |
| 2013/0243270 A1* | 9/2013 | Kamhi | H04N 21/458 |
| | | | 382/118 |
| 2013/0340005 A1 | 12/2013 | Kwan | |
| 2014/0359656 A1* | 12/2014 | Banica | H04N 21/234 |
| | | | 725/32 |

OTHER PUBLICATIONS

Wang et al., "Explore eye movement patterns in search result evaluation and individual document evaluation," Proceedings of the 78th ASIS&T Annual Meeting: Information Science with Impact: Research in and for the Community Article No. 144, St. Louis, Missouri, Nov. 2015, 4 pages.

Reinhartz-Berger, "Can domain modeling be automated?: levels of automation in domain modeling," Proceedings of the 18th International Software Product Line Conference—vol. 1, Florence, Italy, Sep. 2014.

Wulf-Hadash et al., "Cross product line analysis," Proceedings of the Seventh International Workshop on Variability Modelling of Software-intensive Systems Article No. 21, Pisa, Italy, Jan. 2013.

* cited by examiner

VIDEO FRACTAL CROSS CORRELATED ACTION BUBBLE TRANSITION

BACKGROUND

Content broadcasters typically use multiple cameras to capture content during events such as live sporting events. The content broadcasters use multiple cameras to provide a complete user experience in addition to the content broadcaster not knowing when and where the next significant moment will occur. For example, a nationalized tennis event may have ten different matches playing on ten different courts with four different cameras on each of the ten courts. In this example, the content broadcaster typically televises the most "popular" match at a wide angle and shows highlights of the other matches during breaks of the televised match. As a result, users are not able to view and explore other matches and different angles of the televised match.

Today's users are accustomed to personalizing content that they receive throughout the day, and viewing a single video feed from an event is not acceptable. Picture-in-picture (PiP) is a feature that displays one program (channel) on the full TV screen and overlays another program from a different channel. Unfortunately PiP does not provide as much personalization as today's user requires.

Some users merely wait until an event completes and then view the highlights on a computer network such as the Internet. This requires the user to identify a particular event that the user wishes to view. As such, the user does not search and view content of which the user is unaware.

BRIEF SUMMARY

According to one embodiment of the present disclosure, an approach is provided in which the approach displays a main video feed and multiple secondary video feeds on a display that are embedded in the main video feed at multiple locations based on visual characteristics sets of the multiple secondary video feeds. The approach dynamically detects a level of interest of a user at a first one of the locations in the main video feed based on a set of physical characteristics of the user. The approach identifies a first one of secondary video feeds that corresponds to the first location and, in turn, resizes the first secondary video feed on the display based on the detected level of interest.

According to another embodiment of the present disclosure, an approach is provided in which secondary video feeds are displayed in the main video feed by fractal video bubbles. The first secondary video feed is represented by a first one of the fractal video bubbles and a second one of the video feeds is represented by a second one of the fractal video bubbles that is nested within the first fractal video bubble.

According to yet another embodiment of the present disclosure, an approach is provided in which the approach determines that a first one of the visual characteristics sets corresponds to the first secondary video feed. The approach identifies a display region in the main video feed that matches the first visual characteristics set and, in turn, embeds the first fractal video bubble into the main video feed within the identified display region.

According to yet another embodiment of the present disclosure, an approach is provided in which the set of physical characteristics of the user includes an eye gaze and a pupil dilatation. The approaches determines the level of interest in response to tracking the eye gaze and the pupil dilation of the user as the user views the main video feed, and increases a size of the first fractal video bubble in response to determining an increased level of interest at the first location. In response to determining a decreased level of interest at the first location, the approach decreases the size of the first fractal video bubble.

According to yet another embodiment of the present disclosure, an approach is provided in which the approach computes the visual characteristics sets by selecting one of the secondary video feeds; converting a set of frames from the selected secondary video feed into a set of HSL (Hue, Saturation, Lightness) values, a set of RGB (Red, Green, Blue) values, and a set of BW (Black, White) values; computing a set of brightness, hue, and primary colors (BHPC) values based on the set of HSL values, RGB values, and BW values; forecasting the BHPC values over a time period; and modifying the forecasted BHPC values based on performing a conformity data analysis on the BHPC values. The modifying resulting in a selected one of the visual characteristics sets.

According to yet another embodiment of the present disclosure, an approach is provided in which the approach linearly correlates the visual characteristics sets to generate linear correlation values. The approach also non-linearly correlates the visual characteristics sets to generate non-linear correlation values. In turn, the approach positions, in the main video feed, fractal video bubbles corresponding to the secondary video feeds based on their corresponding linear correlation values and their corresponding non-linear correlation values.

According to yet another embodiment of the present disclosure, an approach is provided in which the approach displays the main video feed as a canvas on the display; and replaces the main video feed with the first secondary video feed as the canvas on the display in response to determining an increased level of interest at the first location.

According to yet another embodiment of the present disclosure, an approach is provided in which the main video feed is captured with a first camera at an event, and each of the secondary video feeds is captured secondary cameras at the event.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
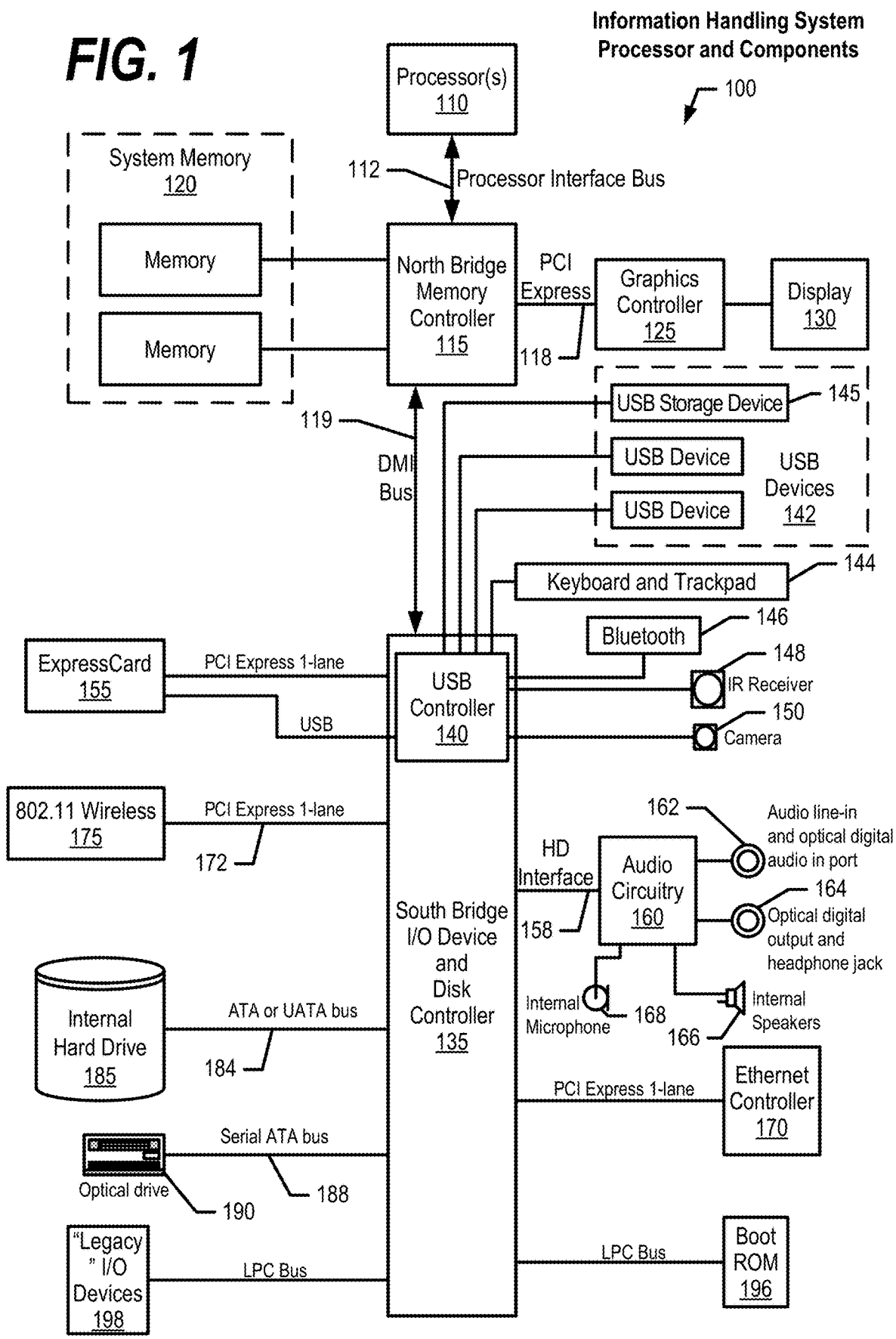
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
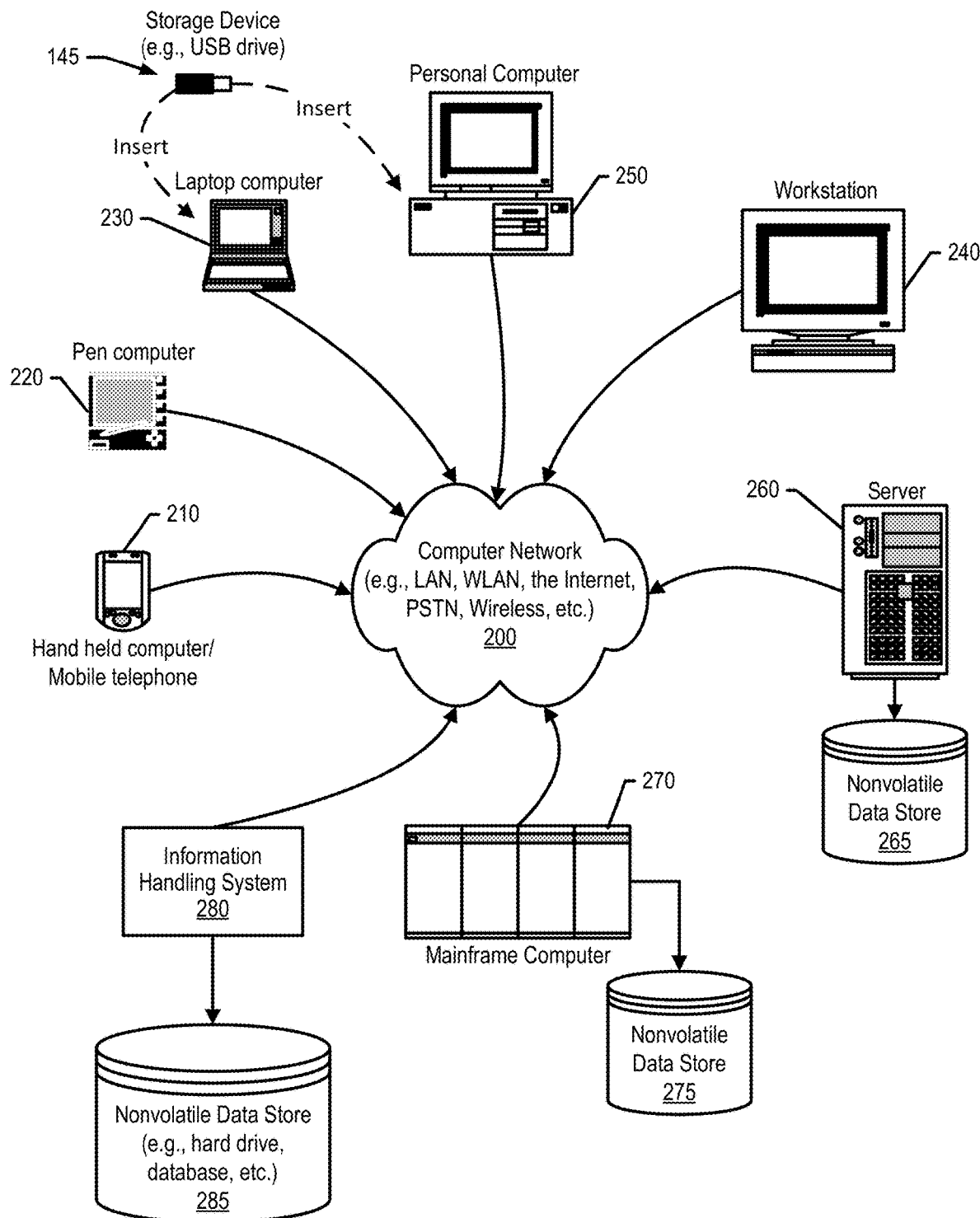
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, todays' approaches do not provide personalized video feed content to which a user is accustomed. FIGS. 3 through 9 depict an approach that can be executed on an information handling system that embeds secondary video feeds as "fractal video bubbles" within a main video feed and monitors a user's physical characteristics (eye gaze, pupil dilation, physical movements, etc.) to determine the user's interest levels and expands the appropriate fractal video bubbles accordingly.

A fractal management system dynamically resizes fractal video bubbles based on image similarity and the user's physical characteristics. The fractal management system nests fractal video bubbles within fractal video bubbles based on various factors such as matching their corresponding visual characteristics to produce a smooth overall canvas to the user. As discussed herein, the fractal management system uses various factors to dynamically adjust the size and position of fractal video bubbles and provides several advantages over prior solutions, such as (i) fractal video bubbles based on image similarity and iris dilation; (ii) fractal video bubble size based on iris dilation and eye gaze focus; (iii) fractal video bubble merging based on RGB (red, green blue) color gradients and HSL (hue/saturation/lightness) color gradients; (iv) eye gaze and iris dilation based on fractal video bubble dissolving; (v) action cheer, gesture recognition, natural language processing in video correlation to iris dilation; and (vi) video excitement scoring cosine similarity to eye gaze focus.

In one embodiment, the approach uses a "fractal" approach that embeds fractal video bubbles within fractal video bubbles (nesting) based on matching visual characteristics to display a smooth flowing canvas on the display. A fractal is typically defined as "any of various extremely irregular curves or shapes for which any suitably chosen part is similar in shape to a given larger or smaller part when magnified or reduced to the same size." As defined herein, fractal video bubbles have hidden smaller fractal video bubbles within themselves and are correlated to surrounding fractal video bubbles based on their visual characteristics sets.

In one embodiment, the approach discovers unknown unknowns of a user's interests, and also uses techniques to determine which aspects of the user's known actions a user prefers (e.g., action sports, winter sports, etc.). The approach is applicable to many domains such as advertisements, entertainment, software development, scientific processes, etc.

In another embodiment, the approach hides previously unknown user interests within a known event of interest. The hidden interest intersections appear as fractal video bubbles and dissolve in and out (resize) of a sequence of interests. In this embodiment, the fractal video bubbles grow/shrink to show "peep holes" of interest into the unknown events as the interest level of a user changes and the action context changes.

In another embodiment, the interest of a user is monitored through precise eye gaze and iris dilation. Iris dilation depicts a user's mental and emotional commotion and interest level. As the interest level of the user changes based on an action scene, fractal video bubbles within another fractal video bubble also grow. In this embodiment, pixels within the main video feed are related to precise action points of the original scene based on colors (visual characteristics sets). However, if the eye dilation shows a complete distaste for the action, the fractal video bubble "pops" and a new fractal video bubble will appear that shows a different secondary video feed.

Figure 3:
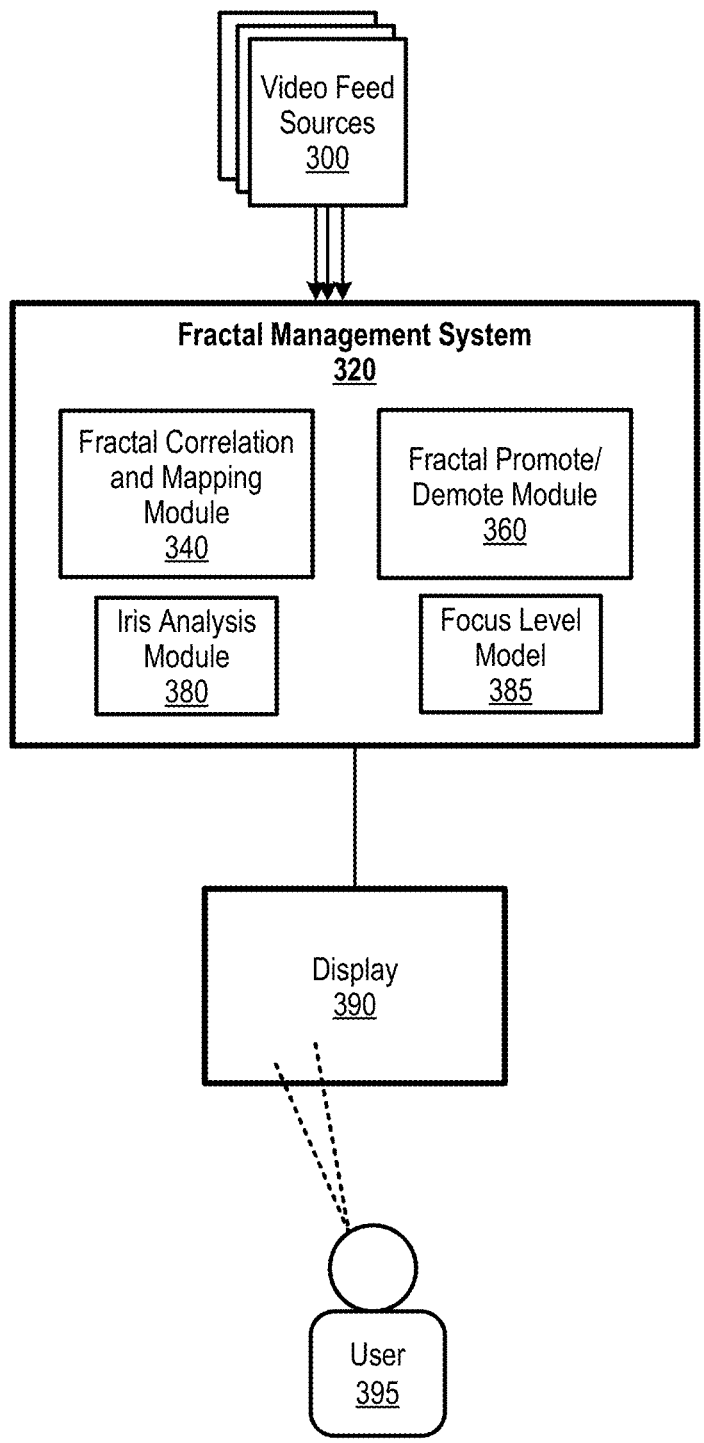
FIG. 3 is an exemplary diagram depicting a fractal management system positioning fractal video bubbles on a display based on their visual characteristics and adjusting the size of the fractal video bubbles based on user interest.

FIG. 3 is an exemplary diagram depicting a fractal management system positioning fractal video bubbles on a display based on their visual characteristics and adjusting the size of the fractal video bubbles based on user interest. Fractal management system 320 receives video feeds from video feed sources 300. In one embodiment, video feed sources 300 originate from cameras at a same event (e.g., sporting event). In another embodiment, video feed sources 300 originate from multiple cameras at multiple events.

Fractal management system 320 selects a video feed from one of video feed sources 300 based on, for example, an initial selection by user 395. Then, fractal management system 320 uses fractal correlation and mapping module 340 to convert each video feed frame over a selected duration to hue/saturation/lightness (HSL) values, red/green/blue (RGB) values, and black/white values (see FIG. 9 and corresponding text for further details), referred to herein as "visual values."

Fractal management system 320 uses the visual values to calculate brightness, hue, and primary color elements for each of the video feeds. Fractal management system 320 then forecasts the elements over time and modifies the forecasted elements based on confirmatory data analysis, such as by using a Granger causality test, to generate visual characteristics sets for the video feeds. A Granger causality test is a statistical hypothesis for determining whether one time series is useful in forecasting another time series (see FIGS. 4, 9, and corresponding text for further details).

Figure 4:
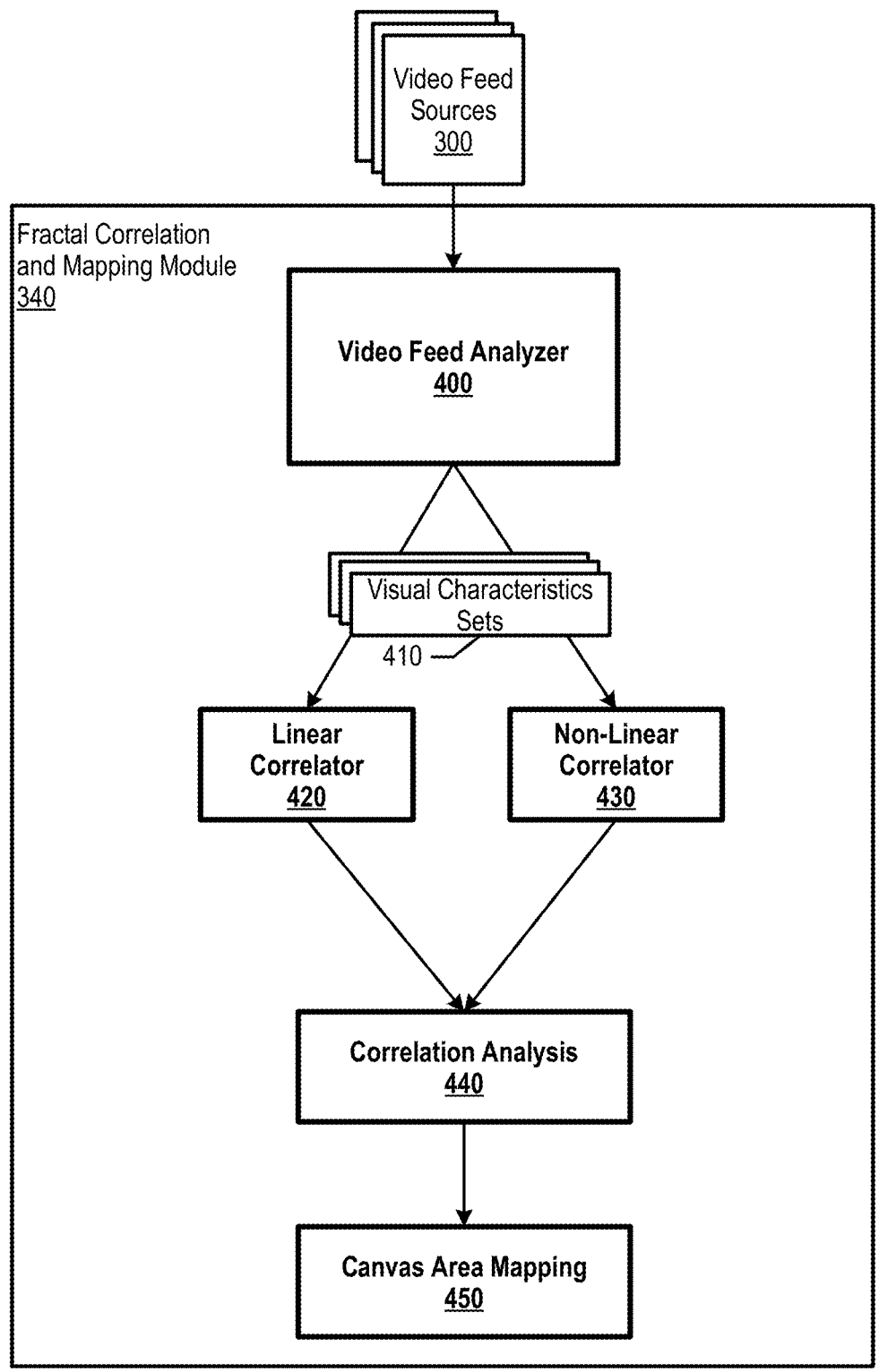
FIG. 4 is an exemplary diagram depicting detail functions of the fractal correlation and mapping module.
Figure 9:
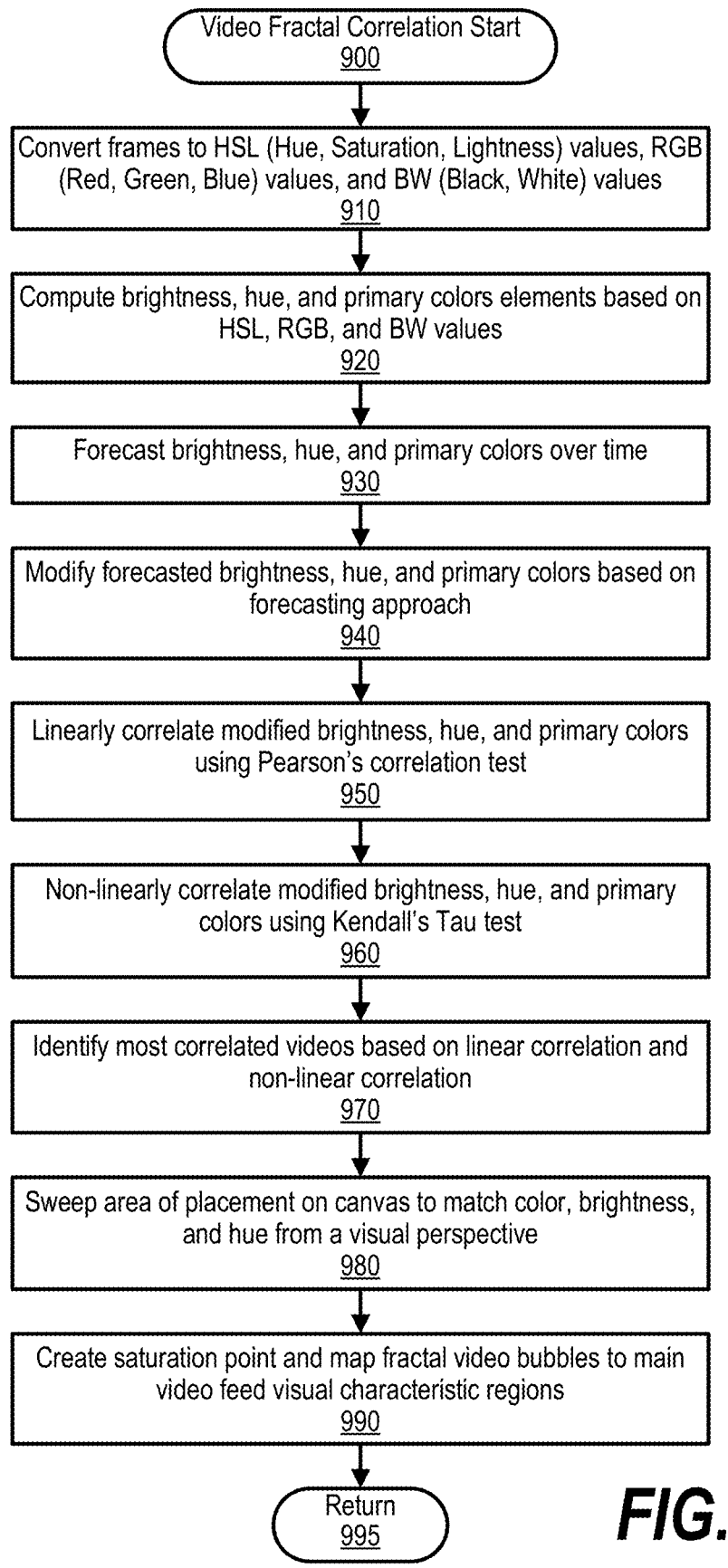
FIG. 9 is an exemplary flowchart showing steps taken to correlate video fractals and place the video fractals on a main video canvas based on their visual characteristics sets.

Fractal management system 320 then performs linear correlation and non-linear correlation on the visual characteristics sets, such as by using a Pearson's correlation and a Kendall's Tau test, respectively (see FIGS. 4, 9, and corresponding text for further details). Fractal management system 320 averages the two correlations and uses the averaged correlations to position their corresponding video feeds close to each other. Fractal management system 320 then sweeps the canvas (main video feed) to identify regions that match the visual characteristics sets (e.g., brightness and hue) from a visual perspective. In one embodiment, fractal management system 320 minimizes visual distraction based on the juxtaposition of the fractal video bubbles onto the canvas within a like region.

As user 395 views a main video feed (with embedded fractal video bubbles) on display 390, iris analysis module 380 evaluates user 395's directional eye gaze and determines which video feed (fractal video bubble) user 395 is viewing. Next, iris analysis module 380 measures the dilation of the iris and fractal management system 320 measures any external actions, such as moving arms, jumping up, etc. These measurements are input into fractal management system 320's focus level model 385 to determine an overall level of interest of the user (e.g., very interested, interested, not interested, etc.).

In one embodiment, fractal management system 320 determines the size of the fractal video bubble being viewed based on a regression between the focus level and the video scale. When the fractal video bubble being viewed should be the main video feed, fractal promote/demote module 360 promotes the secondary video feed corresponding to the fractal video bubble and demotes the current main video feed to, for example, a fractal video bubble. At that time, each video is repositioned and resized on the new main video feed based on eye gaze and iris dilation (see FIG. 8 and corresponding text for further details).

FIG. 4 is an exemplary diagram depicting detail functions of the fractal correlation and mapping module. Fractal correlation and mapping module 340 receives video feeds from video feeds sources 300 and uses video feed analyzer 400 to compute visual characteristics sets 410 using, in one embodiment, the following steps. First, video feed analyzer 400 converts each video feed frame over a pre-determined time duration to hue/saturation/lightness (HSL) values, red/green/blue (RGB) values, and black/white (BW) values.

Next, video feed analyzer 400 uses the visual values to calculate brightness, hue, and primary color elements for each of the video feeds and forecasts the elements over time. Video feed analyzer 400 then modifies the forecasted elements based on, in one embodiment, a Granger causality test. In this embodiment, video feed analyzer 400 uses the following formula to find lag variables:

$$y_t = a_0 + a_1 y_{t-1} + a_2 y_{t-2} + \ldots + a_m y_{t-m} + \text{error}_t$$

Then, in one embodiment, video feed analyzer 400 uses the following formula to augment auto regression by the lagged values and generate visual characteristics sets 410:

$$y_t = a_0 + a_1 y_{t-1} + a_2 y_{t-2} + \ldots + a_m y_{t-m} + b_p x_{t-p} + \ldots + b_q x_{t-q} + \text{error}_t$$

Video feed analyzer 400 feeds visual characteristics sets 410 into linear correlator 420 and non-linear correlator 430. Linear correlator 420, in one embodiment, uses a Pearson's correlation test formula to compute linear correlation values:

$$\rho x, y = \frac{E[(X - u_x)(Y - u_y)]}{\sigma_x \sigma_y}$$

In this embodiment, the Pearson's product-moment correlation coefficient (or Pearson correlation coefficient) is a measure of the strength of a linear association between two variables and is denoted by r. The Pearson product-moment correlation attempts to draw a line of best fit through the data of two variables, and the Pearson correlation coefficient, r, indicates how far away all these data points are to this line of best fit.

Non-linear correlator 430, in one embodiment, uses a Kendall's tau test for the non-linear correlation. Kendall's tau test is a non-parametric measure of relationships between columns of ranked data. The tau correlation coefficient returns a value of 0 to 1, where 0 is no relationship and 1 is a perfect relationship using the following formula:

$$\tau = \frac{(\text{\# concordant pairs}) - (\text{\# discordant pairs})}{n(n-1)/2}$$

Where the statistical significance is computed by:

$$z = \frac{3 * \tau \sqrt{N(N-1)}}{\sqrt{2(2N+5)}}$$

Non-linear correlator 430 computes the z values and looks up the non-linear correlation values in a z-table. In one embodiment, the z-table is a "Standard Normal z-table" and is used in hypothesis testing where the area under the whole of a normal distribution curve is 1, or 100 percent. The z-table indicates a percentage that is under the curve at any particular point.

Results from linear correlator 420 and non-linear correlator 430 feed into correlation analysis 440, which identifies the most correlated video feeds based on the linear correlation values and non-linear correlation values. Correlation analysis 440 provides the correlation information to canvas area mapping 450, which positions the video feeds (fractal video bubbles) on the main video feed accordingly. In one embodiment, canvas area mapping 450 embeds fractal video bubbles within fractal video bubbles within fractal video bubbles based on correlation results and user interests (see FIGS. 5, 6, and corresponding text for further details).

Figure 5:
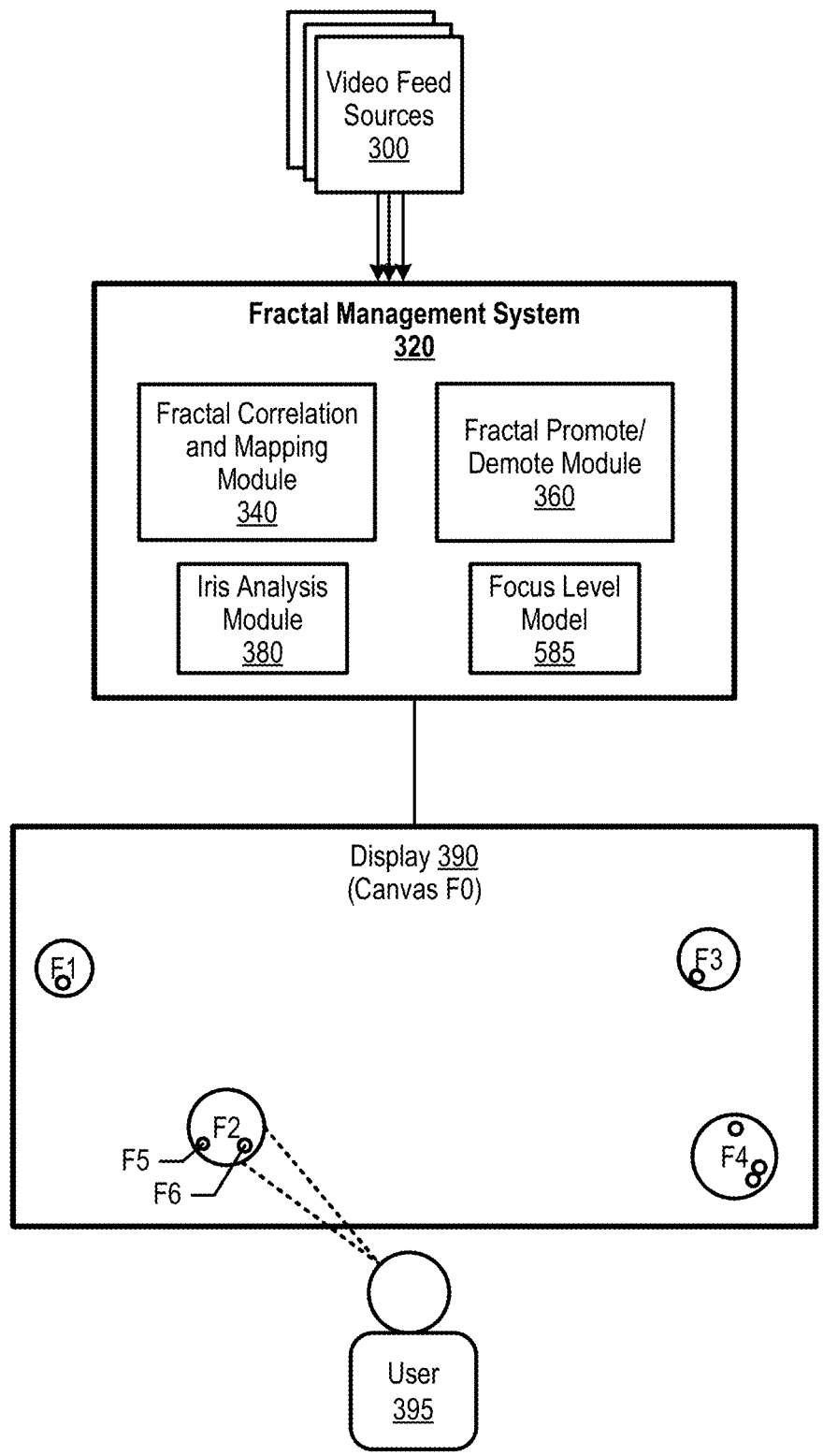
FIG. 5 is an exemplary diagram depicting a fractal management system embedding fractal video bubbles into a main video feed and adjusting the size of the fractal video bubbles based on a user's interest level.

FIG. 5 is an exemplary diagram depicting fractal management system 320 embedding fractal video bubbles into a main video feed and adjusting the size of the fractal video bubbles based on a user's interest level. Fractal management system 320 displays main video feed F0 on display 390 as a "canvas" and embeds fractal video bubbles F1, F2, F3, and F4 into main video feed at positions based on their matching visual characteristics as discussed herein (see FIG. 7 and corresponding text for further details).

FIG. 5 also shows nested fractal video bubbles embedded within fractal video bubbles F1, F2, F3, and F4, such as fractal video bubbles F5 and F6 nested within fractal video bubble F2. The nested fractal video bubbles are also positioned within their respective "parent" fractal video bubble based on their visual characteristics relative to their parent fractal video bubble's visual characteristics set, not necessarily their content relationship (see FIG. 7 and corresponding text for further details). As discussed in detail below, fractal management system 320 adjusts the size and location of the fractal video bubbles based on user 395's eye gaze and level of interest (via iris dilation and/or body movements).

Figure 6:
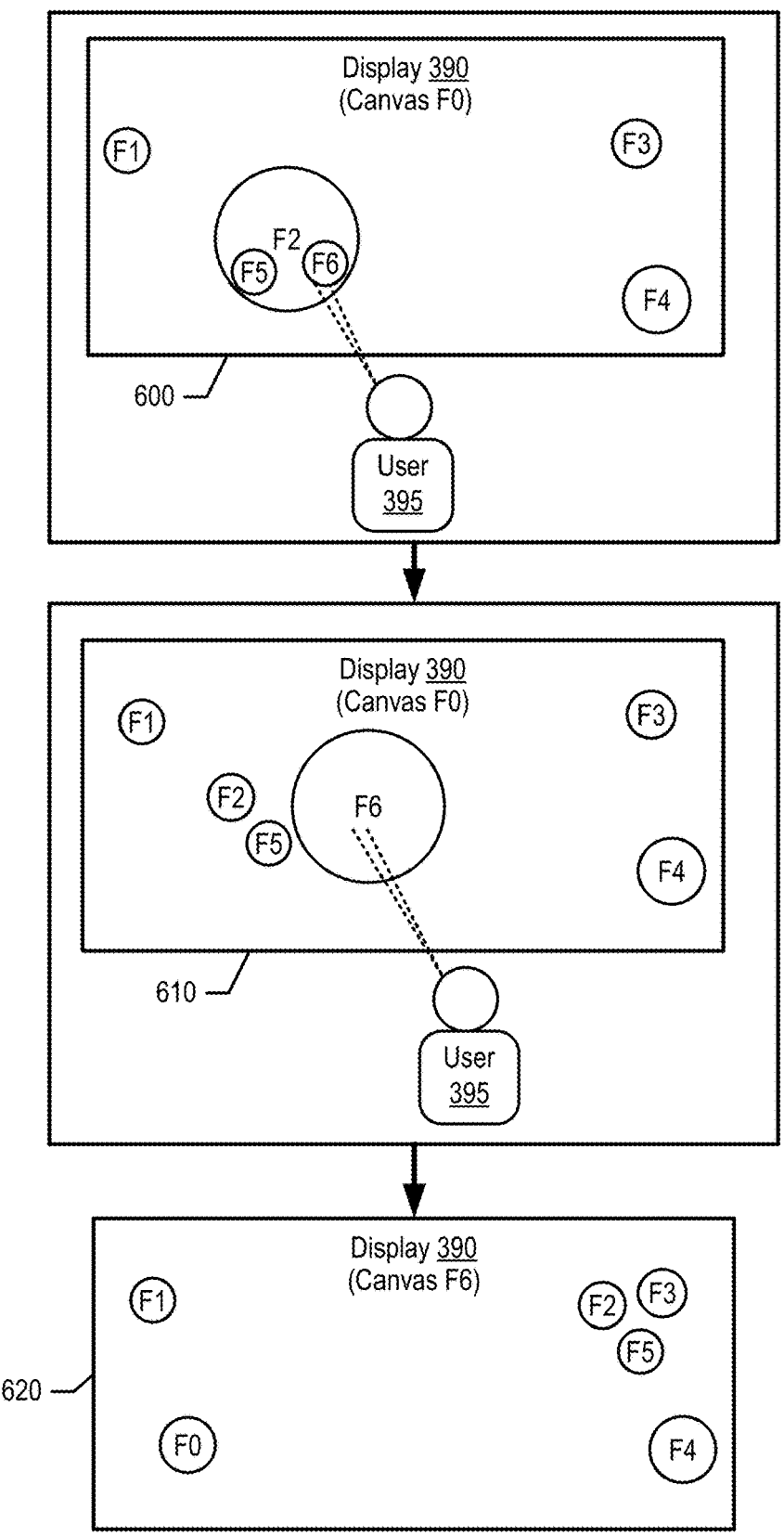
FIG. 6 is an exemplary diagram depicting a fractal management system adjusting fractal video bubbles based on a user's level of interest to respective fractal video bubbles.

FIG. 6 is an exemplary diagram depicting fractal management system 320 adjusting fractal video bubbles based on a user's level of interest to respective fractal video bubbles. Referring back to FIG. 5, fractal management system 320 detects that user 395 is gazing in a location corresponding to fractal video bubble F2. As such, referring to display state 600 in FIG. 6, fractal management system 320 enlarges fractal video bubble F2 and, in one embodiment, also enlarges nested fractal video bubbles F5 and F6.

Fractal management system 320 continues to monitor user 395 and determines that user 395's eye gaze is on fractal video bubble F6 with a high level of interest. As such, referring to display state 610, fractal management system 320 increases the size of fractal video bubble F6 and, in one embodiment, positions fractal video bubble F6 separate from fractal video bubble F2 based on fractal video bubble F6's visual characteristics relative to main video feed F0.

At some point, fractal management system 320 determines that user 395's level of interest to video feed F6 is high enough to become the main video feed. As such, referring to display state 620, fractal management system 320 designates video feed F6 as the main video feed (canvas) and embeds fractal video bubbles, F0, F1, F2, F3, F4, and F9 in main video feed F6 based on their visual characteristics sets relative to main video feed F6's visual characteristics sets.

Figure 7:
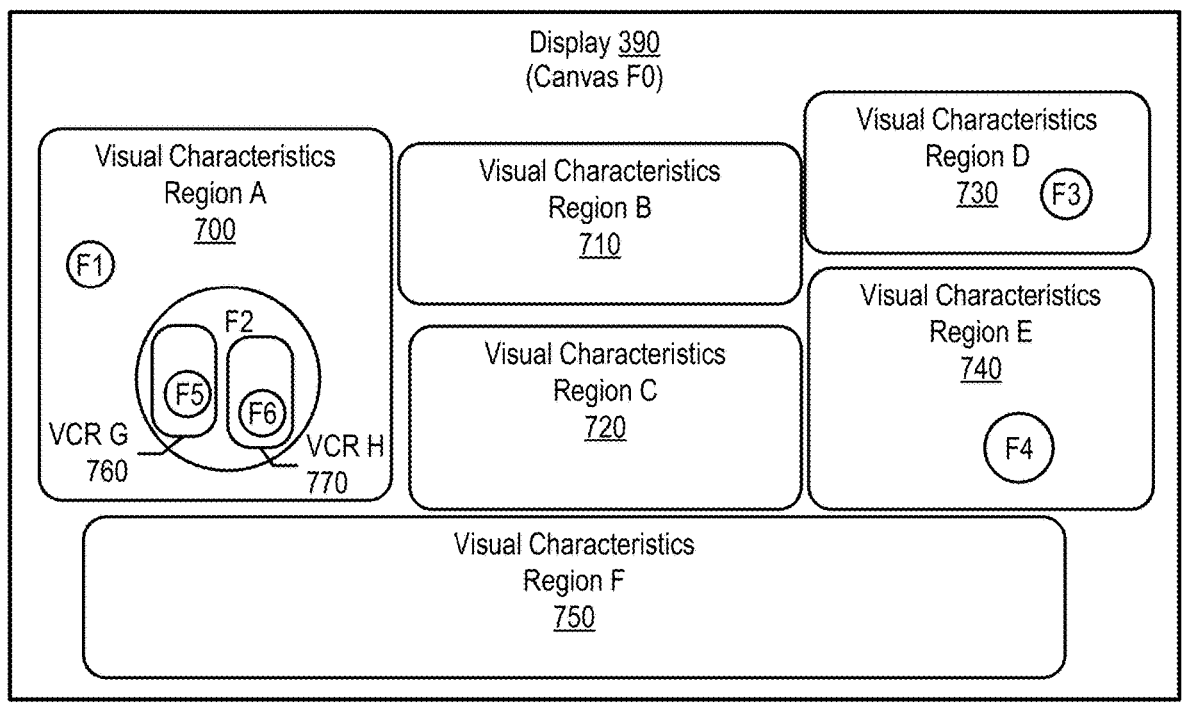
FIG. 7 is an exemplary diagram depicting the fractal management system embedding fractal video bubbles in a main video feed based on their visual characteristics relative to visual characteristic regions of the main video feed.

FIG. 7 is an exemplary diagram depicting the fractal management system embedding fractal video bubbles in a main video feed based on their visual characteristics relative to visual characteristic regions of the main video feed. FIG. 7 shows that fractal management system 320 segments main video feed F0 into visual characteristic regions A 700, B 710, C 720, D 730, E 740, and F 750. Each of the visual characteristic regions has certain characteristics pertaining to brightness, hue, and primary colors. For example, region F may display green grass and fractal management system 320 embeds fractal video bubbles in region F 750 that have similar visual characteristics. Region D 730 may display a gray building and, as such, fractal management system 320 embeds fractal video bubbles in region D 730 (fractal video bubble F3) that have similar visual characteristics.

In addition to fractal management system 320 embedding "parent" fractal video bubbles into main video feed F0 at locations based on their visual characteristics, fractal management system 320 also evaluates visual characteristics of the fractal video bubbles and embeds nested fractal video bubbles into the parent fractal video bubbles. FIG. 7 shows that fractal video bubble F2 has two visual characteristic regions G 760 and H 770. As can be seen, fractal management system 320 determined that fractal video bubble F5's visual characteristics match region 760 and fractal video bubble F6's visual characteristics match region 770. In one embodiment, parent fractal video bubbles and nested fractal video bubbles are not hierarchical with respect to video content, but are instead embedded and positioned based on their correlated visual characteristics. For example, fractal video bubble F2 may show a tennis competition and fractal video bubble F5 may be an animal movie that has similar visual characteristics to a portion of the tennis competition.

Figure 8:
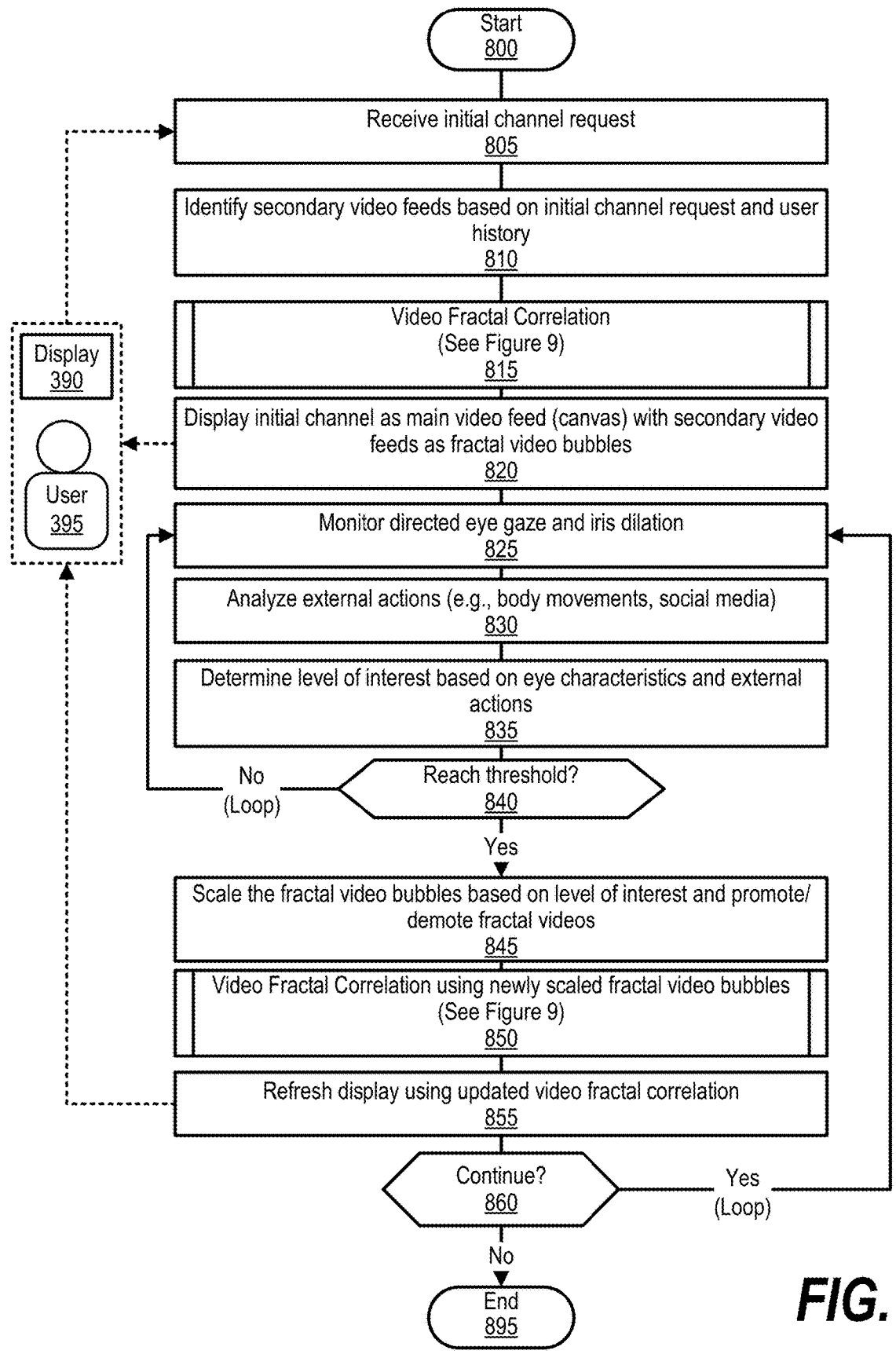
FIG. 8 is an exemplary flowchart depicting steps taken to position fractal video bubbles on a main video canvas based on their visual characteristics and adjust the size of the fractal video bubbles based on user interest.

FIG. 8 is an exemplary flowchart depicting steps taken to position fractal video bubbles on a main video canvas based on their visual characteristics and adjust the size of the fractal video bubbles based on user interest. FIG. 8 processing commences at 800 whereupon, at step 805, the process receives an initial channel request from user 395. At step 810, the process identifies secondary video feeds based on the initial channel request and user history. For example, if the user typically watches extreme sports, the process identifies multiple extreme sports video feeds to embed into the main channel video feed.

At predefined process 815, the process correlates the secondary video feeds with the main video feed and embeds the secondary video feeds as fractal video bubbles into the main video feed (see FIG. 9 and corresponding text for processing details). At step 820, the process displays the main video feed as the canvas with the secondary channels embedded into the main video feed as fractal video bubbles.

At step 825, the process monitors user 400's directed eye gaze and iris dilation and, at step 830, the process analyzes user 395's external actions (physical characteristics) such as jumping up, accessing a social media site, etc. At step 835, the process determines user 395's level of interest based on eye characteristics and external actions.

The process determines as to whether the level of interest reaches a threshold to adjust one or more fractal video bubbles (decision 840). If the level of interest does not reach the threshold, then decision 840 branches to the 'no' branch which loops back to continue to monitor user 395's eyes and physical actions. This looping continues until user 395's level of interest reaches the threshold, at which point decision 840 branches to the 'yes' branch exiting the loop.

At step 845, the process scales the fractal video bubbles based on the level of interest and promotes/demotes the fractal video bubbles accordingly. At predefined process 850, the process correlates the secondary video feeds with the main video feed based on the new scaling promotion/demotion and embeds the secondary video feeds as fractal video bubbles into the main video feed (see FIG. 9 and corresponding text for processing details). At step 855, the process refreshes display 390 using the updated fractal video bubble correlations.

The process determines as to whether continue (decision 860). If the process should continue, then decision 860 branches to the 'yes' branch which loops back to monitor user 395's eye gaze, pupil dilation, and physical characteristics. This looping continues until the process should terminate, at which point decision 860 branches to the 'no' branch exiting the loop. FIG. 8 processing thereafter ends at 895.

FIG. 9 is an exemplary flowchart showing steps taken to correlate video fractals and place the video fractals on a main video canvas based on their visual characteristics sets. The placement of the fractal video bubbles is important so that the canvas continues to flow. FIG. 9 processing commences at 900 whereupon, at step 910, the process converts the video frames to HSL values (Hue, Saturation, Lightness), RGB values (Red, Green, Blue) values, and BW values (Black, White). At step 920, the process computes brightness, hue, primary colors elements based on the HSL elements, RGB elements, and BW elements.

At step 930, the process forecasts brightness, hue, primary colors over a pre-determined time period and, at step 940, the process modifies the forecasted brightness, hue and primary colors elements based on a forecasting approach. In one embodiment, the process uses a Granger causality test as discussed above.

At step 950, the process linearly correlates the modified brightness, hue, and primary colors elements. In one embodiment, the process uses a Pearson's correlation test for the linear correlation as discussed above. At step 960, the process non-linearly correlates the modified brightness, hue, and primary colors elements. In one embodiment, the process uses a Kendall's Tau test for the non-linear correlation as discussed above.

At step 970, the process identifies the most correlated videos based on the linear correlation values and non-linear correlation values. At step 980, the process sweeps the canvas area (main video feed) to match fractal video bubbles color, brightness, and hue to the canvas from a visual perspective. At step 990, the process creates saturation points and maps the fractal video bubbles to the main video feed regions based on the visual characteristics. FIG. 9 processing thereafter returns to the calling routine (see FIG. 8) at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   displaying a main video feed corresponding to an event and a plurality of secondary video feeds on a display, wherein the plurality of secondary video feeds are embedded at a plurality of locations within the main video feed based on a plurality of visual characteristics sets of the plurality of secondary video feeds matching the main video feed at the plurality of locations, wherein the embedding further comprises:
      linearly correlating the plurality of visual characteristics sets of the plurality of secondary video feeds to generate a plurality of linear correlation values;
      identifying a set of the plurality of secondary video feeds that correlate based on their corresponding linear correlation values; and
      positioning the set of secondary video feeds in the main video feed based on their corresponding linear correlation values;
   dynamically detecting a level of interest of a user at a first one of the plurality of locations in the main video feed based on a set of physical characteristics of the user;
   identifying a first one of the set of secondary video feeds that corresponds to the first location; and
   resizing the first secondary video feed on the display based on the detected level of interest.

2. The method of claim 1 wherein:
   the set of secondary video feeds are displayed in the main video feed by the plurality of fractal video bubbles;
   the first secondary video feed is represented by a first one of the plurality of fractal video bubbles; and
   a second one of the set of secondary video feeds is represented by a second one of the plurality of fractal video bubbles that is nested within the first fractal video bubble.

3. The method of claim 2 wherein, prior to displaying the plurality of fractal video bubbles in the main video feed, the method further comprises:
   determining that a first one of the plurality of visual characteristics sets corresponds to the first secondary video feed;
   identifying a display region in the main video feed that matches the first visual characteristics set; and
   embedding the first fractal video bubble into the main video feed within the identified display region.

4. The method of claim 2 wherein the set of physical characteristics of the user comprises an eye gaze and a pupil dilatation, the method further comprising:
   determining the level of interest in response to tracking the eye gaze and the pupil dilation of the user as the user views the main video feed;
   in response to determining an increased level of interest at the first location, increasing a size of the first fractal video bubble; and
   in response to determining a decreased level of interest at the first location, decreasing the size of the first fractal video bubble.

5. The method of claim 1 further comprising:
   computing the plurality of visual characteristics sets, wherein the computing further comprises:
      selecting one of the plurality of secondary video feeds;
      converting a set of frames from the selected secondary video feed into a set of HSL (Hue, Saturation, Lightness) values, a set of RGB (Red, Green, Blue) values, and a set of BW (Black, White) values;
      computing a set of BHPC (brightness, hue, and primary colors) values based on the set of HSL values, RGB values, and BW values;
      forecasting the BHPC values over a time period; and
      modifying the forecasted BHPC values based on performing a conformity data analysis on the BHPC values, wherein the modifying results in a selected one of the plurality of visual characteristics sets corresponding to the selected secondary video feed.

6. The method of claim 5 further comprising:
   non-linearly correlating the plurality of visual characteristics sets to generate a plurality of non-linear correlation values; and
   positioning, in the main video feed, a plurality of fractal video bubbles corresponding the set of secondary video feeds based on their corresponding linear correlation values and their corresponding non-linear correlation values.

7. The method of claim 1 further comprising:
   displaying the main video feed as a canvas on the display; and in response to determining an increased level of interest at the first location, replacing the main video feed with the first secondary video feed as the canvas on the display.

8. The method of claim 1 wherein the main video feed is captured with a first camera at the event, and wherein each of the plurality of secondary video feeds is captured with a plurality of second cameras at the event.

9. An information handling system comprising:
one or more processors;
a memory coupled to at least one of the processors;
a set of computer program instructions stored in the memory and executed by at least one of the processors in order to perform actions of:
displaying a main video feed corresponding to an event and a plurality of secondary video feeds on a display, wherein the plurality of secondary video feeds are embedded at a plurality of locations within the main video feed based on a plurality of visual characteristics sets of the plurality of secondary video feeds matching the main video feed at the plurality of locations, wherein the embedding further comprises:
linearly correlating the plurality of visual characteristics sets of the plurality of secondary video feeds to generate a plurality of linear correlation values;
identifying a set of the plurality of secondary video feeds that correlate based on their corresponding linear correlation values; and
positioning the set of secondary video feeds in the main video feed based on their corresponding linear correlation values;
dynamically detecting a level of interest of a user at a first one of the plurality of locations in the main video feed based on a set of physical characteristics of the user;
identifying a first one of the set of secondary video feeds that corresponds to the first location; and
resizing the first secondary video feed on the display based on the detected level of interest.

10. The information handling system of claim 9 wherein the processors perform additional actions comprising:
the set of secondary video feeds are displayed in the main video feed by the plurality of fractal video bubbles;
the first secondary video feed is represented by a first one of the plurality of fractal video bubbles; and
a second one of the plurality of secondary video feeds is represented by a second one of the plurality of fractal video bubbles that is nested within the first fractal video bubble.

11. The information handling system of claim 10 wherein, prior to displaying the plurality of fractal video bubbles in the main video feed, the processors perform additional actions comprising:
determining that a first one of the plurality of visual characteristics sets corresponds to the first secondary video feed;
identifying a display region in the main video feed that matches the first visual characteristics set; and
embedding the first fractal video bubble into the main video feed within the identified display region.

12. The information handling system of claim 9 wherein the set of physical characteristics of the user comprises an eye gaze and a pupil dilatation, and wherein the processors perform additional actions comprising:
determining the level of interest in response to tracking the eye gaze and the pupil dilation of the user as the user views the main video feed;
in response to determining an increased level of interest at the first location, increasing a size of the first fractal video bubble; and
in response to determining a decreased level of interest at the first location, decreasing the size of the first fractal video bubble.

13. The information handling system of claim 9 wherein the processors perform additional actions comprising:
computing the plurality of visual characteristics sets, wherein the computing further comprises:
selecting one of the plurality of secondary video feeds;
converting a set of frames from the selected secondary video feed into a set of HSL (Hue, Saturation, Lightness) values, a set of RGB (Red, Green, Blue) values, and a set of BW (Black, White) values;
computing a set of BHPC (brightness, hue, and primary colors) values based on the set of HSL values, RGB values, and BW values;
forecasting the BHPC values over a time period; and
modifying the forecasted BHPC values based on performing a conformity data analysis on the BHPC values, wherein the modifying results in a selected one of the plurality of visual characteristics sets corresponding to the selected secondary video feed.

14. The information handling system of claim 13 wherein the processors perform additional actions comprising:
non-linearly correlating the plurality of visual characteristics sets to generate a plurality of non-linear correlation values; and
positioning, in the main video feed, a plurality of fractal video bubbles corresponding the set of secondary video feeds based on their corresponding linear correlation values and their corresponding non-linear correlation values.

15. The information handling system of claim 9 wherein the processors perform additional actions comprising:
displaying the main video feed as a canvas on the display; and
in response to determining an increased level of interest at the first location, replacing the main video feed with the first secondary video feed as the canvas on the display.

16. A computer program product stored in a computer readable storage medium, wherein the computer program product comprises computer program code that, when executed by an information handling system, causes the information handling system to perform actions comprising:
displaying a main video feed corresponding to an event and a plurality of secondary video feeds on a display, wherein the plurality of secondary video feeds are embedded at a plurality of locations within the main video feed based on a plurality of visual characteristics sets of the plurality of secondary video feeds matching the main video feed at the plurality of locations, wherein the embedding further comprises:
linearly correlating the plurality of visual characteristics sets of the plurality of secondary video feeds to generate a plurality of linear correlation values;
identifying a set of the plurality of secondary video feeds that correlate based on their corresponding linear correlation values; and
positioning the set of secondary video feeds in the main video feed based on their corresponding linear correlation values;
dynamically detecting a level of interest of a user at a first one of the plurality of locations in the main video feed based on a set of physical characteristics of the user;

identifying a first one of the set of secondary video feeds that corresponds to the first location; and resizing the first secondary video feed on the display based on the detected level of interest.

17. The computer program product of claim 16 wherein the information handling system performs further actions comprising:

the set of secondary video feeds are displayed in the main video feed by the plurality of fractal video bubbles;

the first secondary video feed is represented by a first one of the plurality of fractal video bubbles; and a second one of the plurality of secondary video feeds is represented by a second one of the plurality of fractal video bubbles that is nested within the first fractal video bubble.

18. The computer program product of claim 17 wherein, prior to displaying the plurality of fractal video bubbles in the main video feed, the information handling system performs further actions comprising:

determining that a first one of the plurality of visual characteristics sets corresponds to the first secondary video feed;

identifying a display region in the main video feed that matches the first visual characteristics set; and embedding the first fractal video bubble into the main video feed within the identified display region.

19. The computer program product of claim 17 wherein the set of physical characteristics of the user comprises an eye gaze and a pupil dilatation, and wherein the information handling system performs further actions comprising:

determining the level of interest in response to tracking the eye gaze and the pupil dilation of the user as the user views the main video feed;

in response to determining an increased level of interest at the first location, increasing a size of the first fractal video bubble; and in response to determining a decreased level of interest at the first location, decreasing the size of the first fractal video bubble.

20. The computer program product of claim 16 wherein the information handling system performs further actions comprising:

computing the plurality of visual characteristics sets, wherein the computing further comprises:

selecting one of the plurality of secondary video feeds;

converting a set of frames from the selected secondary video feed into a set of HSL (Hue, Saturation, Lightness) values, a set of RGB (Red, Green, Blue) values, and a set of BW (Black, White) values;

computing a set of BHPC (brightness, hue, and primary colors) values based on the set of HSL values, RGB values, and BW values;

forecasting the BHPC values over a time period;

modifying the forecasted BHPC values based on performing a conformity data analysis on the BHPC values, wherein the modifying results in a selected one of the plurality of visual characteristics sets corresponding to the selected secondary video feed;

non-linearly correlating the plurality of visual characteristics sets to generate a plurality of non-linear correlation values; and positioning, in the main video feed, a plurality of fractal video bubbles corresponding the set of secondary video feeds based on their corresponding linear correlation values and their corresponding non-linear correlation values.

\* \* \* \* \*